United States Patent

Logan

[11] Patent Number: 5,484,123
[45] Date of Patent: Jan. 16, 1996

[54] SELF-LOCKING VEHICLE ROUTING RETAINER

[75] Inventor: Dan T. Logan, Fremont, Ind.

[73] Assignee: Navistar International Transportation Corp., Chicago, Ill.

[21] Appl. No.: 203,091

[22] Filed: Feb. 28, 1994

[51] Int. Cl.⁶ .................................................. F16M 13/00
[52] U.S. Cl. .......................... 248/68.1; 248/49; 248/74.3; 248/231.31
[58] Field of Search ........................... 248/68.1, 49, 74.3, 248/71, 73, 231.3, 300; 24/135 N; 174/146; 296/203; 280/781, 783, 800; 180/311

[56] References Cited

U.S. PATENT DOCUMENTS

| | | | |
|---|---|---|---|
| 1,862,105 | 6/1932 | Wharam | 280/800 X |
| 2,578,008 | 12/1951 | Judd | 24/135 N |
| 2,919,879 | 1/1960 | Hume | 248/300 X |
| 3,233,851 | 2/1966 | LeMieux et al. | 248/68.1 |
| 3,325,128 | 6/1967 | Elleboudt | 248/68.1 |
| 3,703,794 | 11/1972 | Gracon et al. | 52/714 X |
| 3,907,247 | 9/1975 | LaBate | 248/351 X |
| 4,372,510 | 2/1983 | Skypala | 248/68.1 X |
| 5,103,741 | 4/1992 | Grund et al. | 312/223.6 X |

FOREIGN PATENT DOCUMENTS

| | | | |
|---|---|---|---|
| 4211410 | 10/1993 | Germany | 280/783 |

*Primary Examiner*—Karen J. Chotkowski
*Attorney, Agent, or Firm*—Dennis K. Sullivan

[57] ABSTRACT

A self-locking vehicle routing retainer comprises a U-shaped spring steel body which is nestably engageable within a frame rail channel of a vehicle such as a truck and retained by engagement of the outturned edges of the legs of the body with the frame rail flanges. The central portion of the body includes an arched bundle attachment arm projecting away from the body. Each surface of the arch may be provided with structure to which a cable tie for holding elongated members such as wiring harnesses or brake tubing may be engaged.

9 Claims, 3 Drawing Sheets

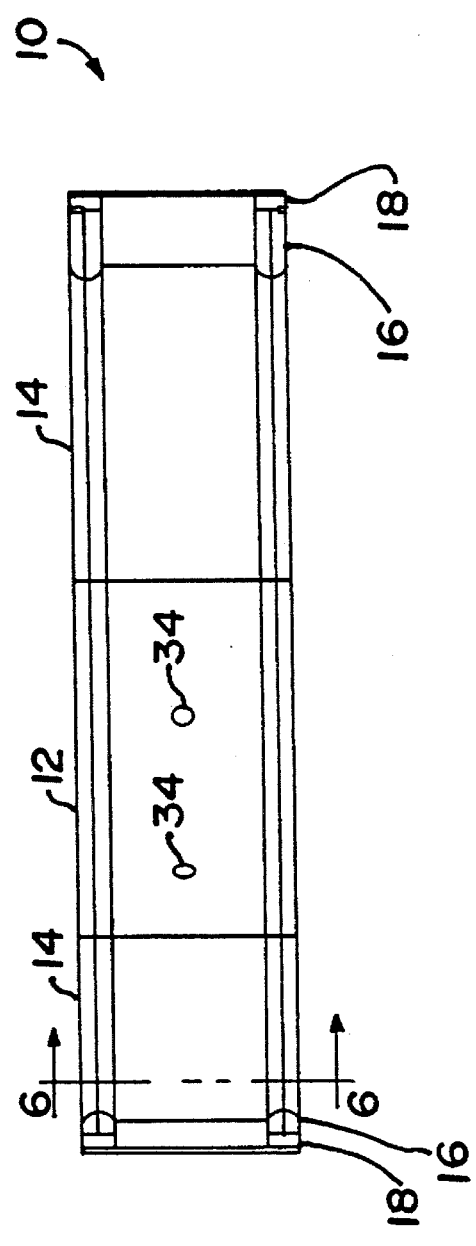
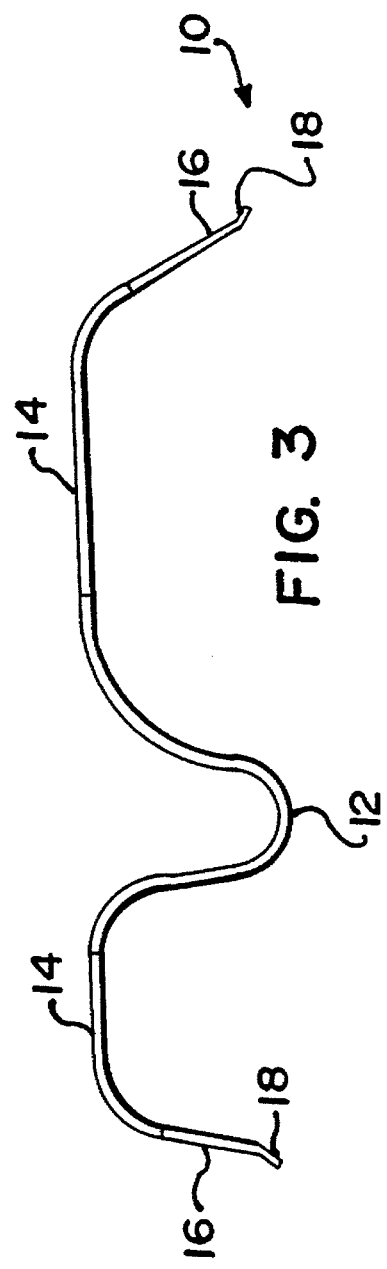
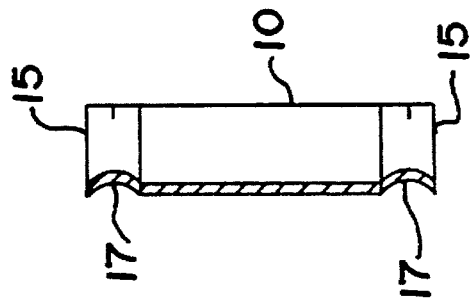

SELF-LOCKING VEHICLE ROUTING RETAINER

BACKGROUND OF THE INVENTION

The present invention relates to a self-locking vehicle routing retainer which nests within a vehicle frame rail of the C-section type and cannot be removed therefrom without using a tool such as a screwdriver. One or two self-locking bundling straps or cable ties are mounted to the retainer for holding elongated members, such as wiring harnesses, brake lines, and the like, in place along the frame rail.

THE PRIOR ART

Heretofore, routing and clamping of elongated members such as wiring harnesses, tubes, hoses and the like has been accomplished using a variety of routing retainers. The severe nature of the operating conditions, such as vibration, rough surfaces, temperature, and moisture, to which routing retainers are exposed in automotive vehicles, especially trucks, requires a high degree of reliability in retaining such elongated members to the frame. Cost and limitations on drilling holes in the frame rails require that such retainers be attached without bolts where possible but in a manner preventing the retainer from unintentionally becoming disengaged from the frame rail. Although some prior art retainers can be mounted to the frame rail or a flanged edge thereof without bolts or piercing the rail, none are adapted to be nested totally within a frame rail of a vehicle and self-secured therein in a manner preventing them from being detached without tools, as is the retainer of the present invention.

SUMMARY OF TEE INVENTION

Accordingly it is a primary object of the invention to provide a self-locking vehicle routing retainer which nests within a frame rail of a vehicle in a self-locking manner and which supports one or more elongated members attached thereto as by a cable tie.

It is a further object of the invention to provide a retainer which will support a plurality of elongated members thereto.

Still further it is an object to provide a retainer which snap locks itself into the rail channel.

Still further it is an object to provide a retainer which is configured to avoid interfering with openings in wishbone type cross members to which the retainer may contiguously be placed.

Still further it is an object to provide a retainer made of spring steel which will maintain its preset configuration.

These and other objects are provided in a self-locking vehicle routing retainer adapted for nested engagement within a vehicle frame rail and being adapted to have a bundle of elongated members secured thereto, being an integrally formed U-shaped spring steel body having a main body portion disposed to engage the frame rail web and upper and lower leg portions respectively disposed at an obtuse angle to said main body portion to engage the frame rail flanges. An arch-shaped bundle attachment arm projects from the main body and has structure such as apertures to permit the attachment one or more cable ties to capture a bundle of elongated members such as wiring harnesses or brake tubing.

BRIEF DESCRIPTION OF THE DRAWINGS

Other objects and advantages of the invention will become more apparent upon perusal of the detailed description thereof and upon inspection of the drawings in which: FIG. 2 is a top view of the retainer; FIG. 3 is a side view of the retainer; FIG. 6 is a section taken through the retainer of FIG. 2 along the line 6—6 thereof.

DESCRIPTION OF THE PREFERRED EMBODIMENT

Figure 1:
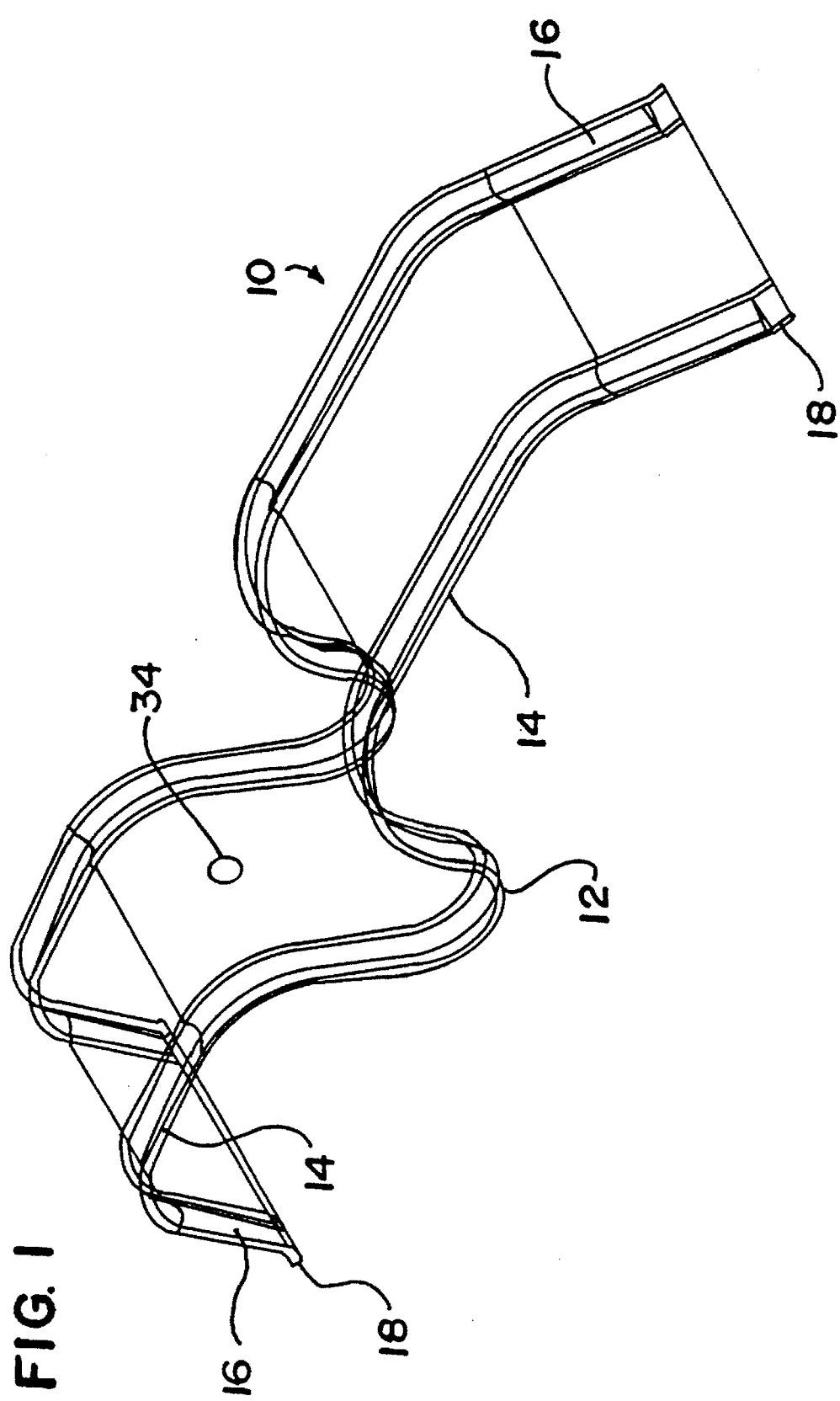
FIG. 1 is a perspective view of the retainer made in accordance with the teachings of the present invention.
Figure 4:
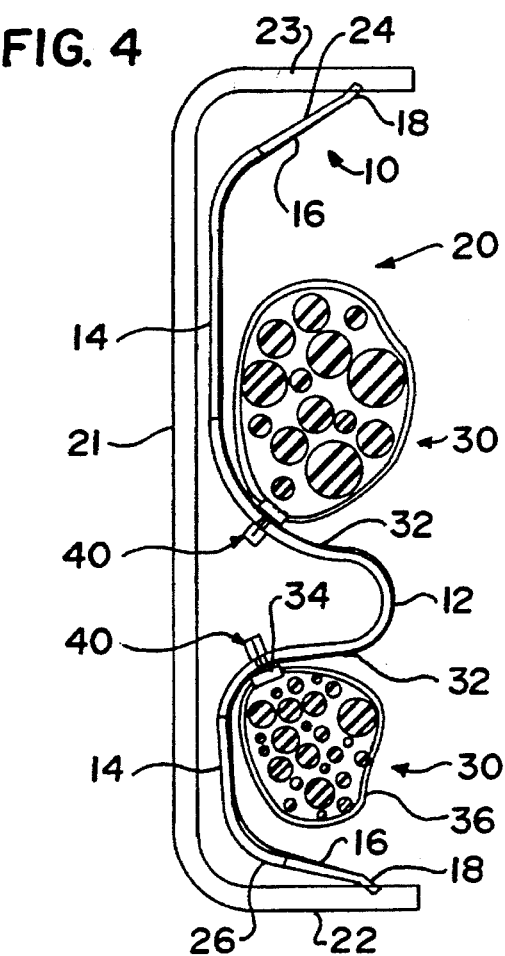
FIG. 4 is a side view of the retainer shown engaged within a channel of a truck frame rail, the retainer shown engaging thereto one bundle of wires and one bundle of tubes.

Referring now to the drawings in greater detail, there is illustrated therein a self-locking vehicle routing retainer made in accordance with the teachings of the present invention and generally identified by the reference numeral 10 which is adapted to be nested within a channel section vehicle frame rail 22 having a web portion 21 and flange portions 23 as best shown in FIG. 4.

The retainer 10 is a single piece U-shaped element integrally formed from a strip of spring steel having a main body portion 14 having a length less than the height of the frame rail web 21 and of relatively short width compared to its height including an arch-shaped bundle attachment arm 12 formed therein. Leg portions 16 of the retainer 10 are disposed at an obtuse angle to the main body portion 14 and extend in the same direction as the bundle attachment arm 12. Each leg 16 terminates in a distal end having a radially outturned angled lip 18 which, when the retainer 10 is engaged within a frame rail 22 as shown in FIG. 4, digs into the flanges 23 thereof to secure the position of the retainer 10 therein with the main body abutting the web portion 21. The lips 18, together with the characteristics of the spring steel from which the retainer 10 is made, make it extremely difficult, if not impossible, to remove the retainer 10 from its engagement within the frame rail 22, without use of a tool. Thus, a retainer 10 is provided which will not disengage from its attachment under conditions to which a truck is often exposed.

The width of the retainer 10 must be sufficient to prevent the retainer from pivoting about the engagement points of the distal ends 18 with the frame rail flanges. Such pivoting could otherwise lead to disengagement of the retainer from the frame rail. Further, as shown in FIG. 6, ribs 17 are formed along the lateral edges 15 of the retainer 10 in order to stiffen the retainer.

In nesting the retainer 10 within a frame rail 22, it has been found that a vertically off-center position of the bundle attachment arm 12 is desirable for many reasons. First, there are times when the retainer 10 must be placed adjacent a junction between a frame rail 22 and a wishbone cross member (not shown) which may have a cutout therein for passage of elongated elements therethrough, usually near the center of the web 21. An off-center position of the arm 12 will not interfere with passages of the bundled wiring or tubing through the cutout in such cross member.

Further, it has been found that installation of the retainer 10 is eased if the arm 12 is not centered. In this respect, it has been found that if an installer sets an end 4 furthest from the arch 12 into the frame rail channel 20 first and then bumps an end 26 closest to the arch 12, by bumping against the planar section 14, the retainer 10 snaps into engagement within the frame rail channel 20, locking itself in place.

Figure 5:
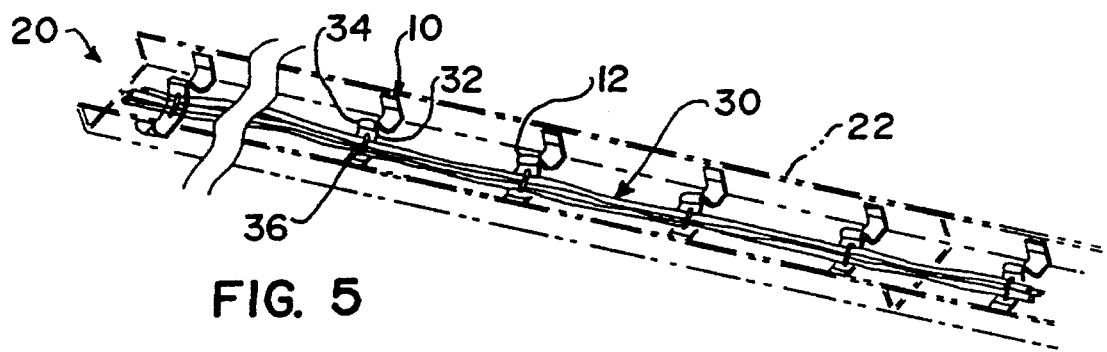
FIG. 5 is a perspective view of a frame rail showing a plurality of retainers engaged therein.

Once the retainer 10 is nested within the frame rail 22 as shown, bundles 30 of wires, harnesses, hoses and the like can be fixed thereto as shown in FIGS. 4 and 5. In this respect, the arm 12 is provided on each side surface 32 thereof, with a cooperative bundle attachment means such as an aperture 34 through which a cable tie 36 may be fed and self engage therein, such as by using a push mount clip 40. Within the confines of each strap 36, one or more bundles 30 of elongated elements may be suspended as desired, one above the arm 12 and one below the arm 12, when the retainer 10 is oriented as shown in FIG. 4.

Removal of the retainer 10 from the frame rail can be accomplished by inserting a screwdriver blade between the ribs 17 and the frame rail flange 22 at the end of the retainer and thereby lifting the outturned lip 18 out of engagement with the flange.

As described above, the retainer provides a number of advantages, some of which have been described above and others of which are inherent in the invention. Also, modifications may be proposed to the retainer without departing from the teachings herein. Accordingly, the scope of the invention is only to be limited as necessitated by the accompanying claims.

What is claimed is:

1. In combination with a vehicle frame rail of channel section having spaced flanges joined by a web portion, a self-locking vehicle routing retainer for engagement within said frame rail, said retainer being adapted to have a bundle of elongated members secured thereto and comprising an integrally formed U-shaped spring steel body including:

a main body portion of a length less than the distance between said flanges of said frame rail and a width less than its height;

upper and lower leg portions respectively disposed at an obtuse angle to said main body portion and extending therefrom to distal ends disposed a distance from said main body portion less than the length of said frame rail flanges, said retainer being retained by frictional engagement of said distal ends with said frame rail flanges within an inner periphery of said frame rail defined by said web portion and said frame rail flanges; and cooperative means permitting the attachment of said bundle of elongated members to said main body portion.

2. The retainer of claim 1 wherein said main body portion further comprises a bundle attachment arm projecting therefrom on the same side thereof as said leg portions.

3. The retainer of claim 2 wherein said cooperative means is disposed on said bundle attachment arm.

4. The retainer of claim 3 wherein said cooperative means comprises an aperture in said bundle attachment arm.

5. The retainer of claim 3 wherein said cooperative means comprises an aperture in said arched portion.

6. The retainer of claim 5 wherein said arch has two legs and each leg having structure therein to which a cable tie may be suitably engaged.

7. The retainer of claim 2 wherein said bundle attachment arm comprises an arched portion integrally formed in said main body portion between said leg portions.

8. The retainer of claim 7 wherein said cooperative means is disposed on said arched portion.

9. The retainer of claim 1 wherein said distal ends of said legs are outturned away from said main body to enhance gripping said flanges.

* * * * *